(12) United States Patent
Yanosy, Jr. et al.

(10) Patent No.: US 11,188,585 B2
(45) Date of Patent: Nov. 30, 2021

(54) SYSTEMS AND METHODS FOR ALIGNING DATA TABLES TO DOMAIN ONTOLOGIES

(71) Applicant: KPMG LLP, New York, NY (US)

(72) Inventors: John A. Yanosy, Jr., Grapevine, TX (US); Christopher Wicher, Raleigh, NC (US)

(73) Assignee: KPMG LLP, New York, NY (US)

( * ) Notice: Subject to any disclaimer, the term of this patent is extended or adjusted under 35 U.S.C. 154(b) by 249 days.

(21) Appl. No.: 16/175,327

(22) Filed: Oct. 30, 2018

(65) Prior Publication Data

US 2020/0134092 A1 Apr. 30, 2020

(51) Int. Cl.
*G06F 16/30* (2019.01)
*G06F 16/36* (2019.01)
*G06F 16/84* (2019.01)
*G06F 16/22* (2019.01)

(52) U.S. Cl.
CPC ............ *G06F 16/367* (2019.01); *G06F 16/22* (2019.01); *G06F 16/86* (2019.01)

(58) Field of Classification Search
None
See application file for complete search history.

(56) References Cited

U.S. PATENT DOCUMENTS

| | | | |
|---|---|---|---|
| 7,069,260 B2 | 6/2006 | Yanosy | |
| 7,571,149 B1 | 8/2009 | Yanosy, Jr. | |
| 7,644,052 B1 * | 1/2010 | Chang | G06N 5/022 |
| | | | 706/45 |
| 8,631,048 B1 | 1/2014 | Davis et al. | |
| 8,655,882 B2 | 2/2014 | Kretz et al. | |
| 8,849,860 B2 * | 9/2014 | Ilyas | G06F 16/84 |
| | | | 707/791 |
| 9,892,029 B2 | 2/2018 | Chappalgaon et al. | |
| 2010/0228782 A1 * | 9/2010 | Rao | G06F 16/367 |
| | | | 707/794 |
| 2012/0102050 A1 * | 4/2012 | Button | G06F 16/9535 |
| | | | 707/749 |
| 2016/0179979 A1 * | 6/2016 | Aasman | G06F 16/278 |
| | | | 707/603 |
| 2016/0180438 A1 * | 6/2016 | Boston | G06Q 30/0282 |
| | | | 705/26.7 |
| 2017/0046425 A1 | 2/2017 | Tonkin et al. | |

(Continued)

FOREIGN PATENT DOCUMENTS

KR 10-1301077 B1 9/2013

OTHER PUBLICATIONS

Stanford Encyclopedia of Philosophy, "Classical Logic", 18 pages, retrieved from the Internet Archive WayBack Machine <https://web.archive.org/web/20170911192934/https://plato.stanford.edu/entries/logic-classical/> on Nov. 19, 2019.

(Continued)

*Primary Examiner* — Jau Shya Meng
(74) *Attorney, Agent, or Firm* — Hunton Andrews Kurth LLP

(57) ABSTRACT

Systems and methods disclosed herein provide for semantically aligning data tables, controlled domain vocabularies, and domain ontologies. The systems and methods provide for aligning the data tables, controlled domain vocabularies, and domain ontologies based on a proxy table ontology representing a physical syntactical structure of the data table.

20 Claims, 13 Drawing Sheets

(56) References Cited

U.S. PATENT DOCUMENTS

2017/0270197 A1\* 9/2017 Miracolo .............. G06F 16/93
2018/0189284 A1\* 7/2018 Hosabettu ............ G06F 12/082

OTHER PUBLICATIONS

Stanford Encyclopedia of Philosophy, "First-order Model Theory", 11 pages, retrieved from the Internet Archive WayBack Machine <https://web.archive.org/web/20170911112635/https://plato.stanford.edu/entries/modeltheory-fo/> on Nov. 19, 2019.

W3C, Web Page <https://www.w3.org/>, 8 pages, retrieved from the Internet Archive WayBack Machine <https://web.archive.org/web/20170901030538/http://www.w3.org/TR/owl2-overview/> on Nov. 19, 2019.

W3C, Web Page <https://www.w3.org/>, 12 pages, retrieved from the Internet Archive WayBack Machine <https://web.archive.org/web/20170818180515/http://www.w3.org/TR/2012/REC-owl2-direct-semantics-20121211/> on Nov. 21, 2019.

W3C, Web Page <https://www.w3.org/>, 3 pages, retrieved from the Internet Archive WayBack Machine <https://web.archive.org/web/20170901153725/http://www.w3.org/2004/02/skos/> on Nov. 21, 2019.

W3C, Web Page <https://www.w3.org/>, 3 pages, retrieved from the Internet Archive WayBack Machine <https://web.archive.org/web/2017101250303/https://www.w3.org/TR/skos-reference/skos-xl.html> on Nov. 21, 2019.

W3C, Web Page <https://www.w3.org/>, 101 pages, retrieved from the Internet Archive WayBack Machine <https://web.archive.org/web/20170926013937/http://www.w3.org/TR/xmlschema-2/> on Nov. 21, 2019.

W3C, Web Page <https://www.w3.org/>, 43 pages, retrieved from the Internet Archive WayBack Machine <https://web.archive.org/web/20170912032346/http://www.w3.org/TR/2009/REC-skos-reference-20090818/>on Dec. 20, 2019.

Ontology Alignment Evaluation Initiative, Web Page <http://.oaei.ontologymatching.org>, 2 pages, retrieved from the Internet Archive WayBack Machine <https://web.archive.org/web/20170929064317/http://oaei.ontologymatching.org/> on Nov. 21, 2019.

OSF Wiki, Web Page <http://wiki.opensemanticframework.org/index.php/Main_Page>, 1 page, retrieved from the Internet Archive WayBack Machine <https://web.archive.org/web/20170113104329/http://wiki.opensemanticframework.org/index.php/Common_External_Ontologies> on Nov. 21, 2019.

OSF Wiki, Web Page <http://wiki.opensemanticframework.org/index.php/>, 9 pages, retrieved from the Internet Archive WayBack Machine <https://web.archive.org/web/20171003091901/http://wiki.opensemanticframework.org/index.php/Lightweight_Domain_Ontologies_Development_Methodology> on Nov. 21, 2019.

Sanchez, Elaboration of Controlled Vocabularies Using SKOS, SKOS Workshop, DCMI Global Meetings & Conferences, DC-2015, São Paulo, Brazil, retrieved from <dcevents.dublincore.org/lntConf/dc-2015/paper/view/File/404/464>, 73 pp, Sep. 2015.

Tao et al, Terminology Representation Guidelines for Biomedical Ontologies in the Semantic Web Notations, <https://www.ncbi.nlm.nih.gov/pmc/articles/PMC3563768/>, 29 pp, Feb. 2013.

Wyner et al., "Argument Schemes for Legal Case-based Reasoning", Proceedings of the 2007 Conference on Legal Knowledge and Information Systems: JURIX 2007: The Twentieth Annual Conference, pp. 139-149.

Shokouhi et al., "An overview of case-based reasoning applications in drilling engineering", Artif Intell Rev, DOI 10.107/s10462-011-9310-2, Published online Jan. 3, 2012, pp. 1-13.

\* cited by examiner

FIG. 3A

| Loan | Borrower | Lender | Collateral | Loan Amount |
|---|---|---|---|---|
| L001 | XXX Real Estate Inc. | XX Bank | Real Estate – Lot 60, Chicago, IL | $600,000 |
| L002 | YYY Finances Inc. | XX Bank | Real Estate –Lot 123, Chicago, IL | $1,200,000 |
| L003 | ZZZ Company | XX Bank | Real Estate –Lot 75, Chicago, IL | $800,000 |
| L004 | TTT Company | XX Bank | Real Estate –Lot 12, Chicago, IL | $300,000 |

FIG. 3B

| Loan | Loan Agreement | Guarantor | Secured |
|---|---|---|---|
| L001 | Agr1 | X Broker | Yes |
| L002 | Agr2 | GG Investment Firm | No |
| L003 | Agr3 | Harold Tyke | Yes |
| L004 | Agr4 | Stephen Zane | Yes |

SYSTEMS AND METHODS FOR ALIGNING DATA TABLES TO DOMAIN ONTOLOGIES

FIELD OF THE INVENTION

The present invention relates generally to information and computer science, and more particularly to a system and method for semantically aligning data tables, controlled domain vocabularies, and domain ontologies.

BACKGROUND

Once a design of a knowledge system, which contains ontologies representing knowledge about a domain for a specific purpose, is completed, the issue then focuses on how to populate a set of facts describing certain domain entities consistent with the corresponding ontology model and domain vocabulary. In this regard, previous knowledge system ontology design tools provided a variety of capabilities to manually create a set of mapping alignments between a table's structure and a selected target domain ontology in order to populate a knowledge base with the content of the table's cells, which are generally organized by rows and columns. However, previous systems suffered from the need for a knowledge engineer or ontologist to manually design the alignment mapping file for each table's structure. If the table structure changed, even slightly, the manual alignment mapping design process had to be repeated. Further, the knowledge engineer or ontologist was also required to cognitively interpret the implicit domain knowledge model represented by each table structure. For example, the knowledge engineer or ontologist was required to assess the purpose of a table, the meaning of the labels in the table, and the relationships between columns implied by a user's understanding of background knowledge that is relevant to the table. Compounding these problems was the variety of lexical terms used for table row and column labels even in the same domain. In fact, even changes in labels would necessitate a new alignment mapping file. Accordingly, such systems were generally associated with high processing time (and, therefore, cost), especially in situations including many different table structures with overlapping implicit domain content.

As such, there is a need for a system that, with minimal guidance, would align a table's structure with a selected target domain ontology as well as account for different lexical labels in the table, regardless of the table's labeled row and column informational structure.

SUMMARY

According to an embodiment, the invention relates to semantic alignment systems and methods that provide a capability to interpret the meaning of a table's content through the discovery of the closest semantically-aligned domain ontology. This is achieved by discovering the closest semantic alignment of a table's labeled row and column structure with one or more knowledge organization systems, e.g., domain vocabularies (or taxonomies), and one or more models of domain knowledge represented by a domain ontology. In addition, the systems and methods provide the ability to control the target ontologies and domain knowledge organization systems to be used by the semantic alignment system.

According to an embodiment, a system for aligning a data table to a domain ontology includes (i) a client device, wherein the client device is configured to receive the data table, (ii) at least one server, wherein the at least one server is configured to store a plurality of domain ontologies and the corresponding ontology knowledge bases, and (iii) a processor, wherein the processor is configured to: receive the data table from the client device; generate a proxy table ontology based on the received data table, wherein the proxy table ontology represents a physical syntactical structure of the data table, wherein the physical syntactical structure identifies headings associated with columns and rows of the data table; map the data table to the proxy table ontology to generate a first combined ontology, wherein labels associated with a plurality of data cells of the data table are mapped to the identified headings; align the first combined ontology with a controlled domain vocabulary to generate a second combined ontology, wherein the aligning includes semantically matching the identified headings with corresponding labels in the controlled domain vocabulary; align the second combined ontology with a domain ontology to generate a third combined ontology, wherein the aligning includes semantically mapping a domain concept defined in the controlled domain vocabulary to an ontology class defined in the domain ontology; and populate the third combined ontology with table content from the received data table.

According to an embodiment, a method for aligning a data table to a domain ontology includes: receiving, at a processor, the data table; generating, with the processor, a proxy table ontology based on the received data table, wherein the proxy table ontology represents a physical syntactical structure of the data table, wherein the physical syntactical structure identifies headings associated with columns and rows of the data table; mapping, with the processor, the data table to the proxy table ontology to generate a first combined ontology, wherein labels associated with a plurality of data cells of the data table are mapped to the identified headings; aligning, with the processor, the first combined ontology with a controlled domain vocabulary to generate a second combined ontology, wherein the aligning includes semantically matching the identified headings with corresponding labels in the controlled domain vocabulary; aligning, with the processor, the second combined ontology with a domain ontology to generate a third combined ontology, wherein the aligning includes semantically mapping a domain concept defined in the controlled domain vocabulary to an ontology class defined in the domain ontology; and populating, with the processor, the third combined ontology with table content from the received data table.

Exemplary embodiments of the invention provide a number of advantages over the previous systems, including: (i) reduction in the need for expert ontologists and knowledge engineers to utilize complex ontology design software to manually specify the semantic alignment between tables and one or more ontologies, (ii) an automatic adaptation to changes in table structure and labels, (iii) capability to control the set of target ontologies and controlled domain vocabularies to utilize for semantic alignment of a table for its interpretation by the ontology, and (iv) the ability for the system to populate an ontology knowledge base with additional facts implied by the semantic alignment of the table's structure with the ontology that were not defined in the table itself.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3A is a diagram illustrating a data table according to an exemplary embodiment of the invention.

FIG. 3B is a diagram illustrating another data table according to an exemplary embodiment of the invention.

DETAILED DESCRIPTION OF EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person skilled in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
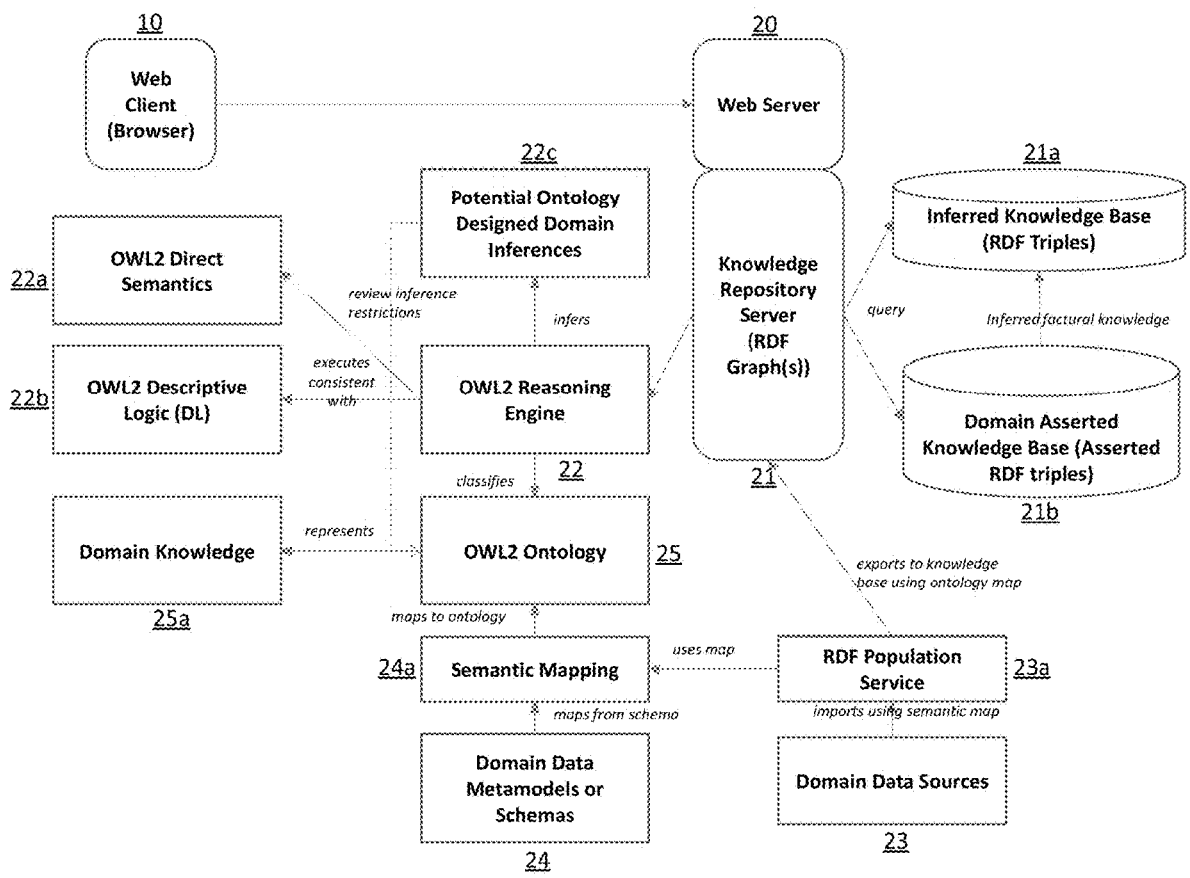
FIG. 1 is a diagram of a generic ontology knowledge system according to an exemplary embodiment of the invention.

FIG. 1 is a diagram of a generic ontology knowledge and reasoning system according to an exemplary embodiment of the invention. According to an embodiment, the generic ontology knowledge system has one or more computer processor(s) that provides the computer processing power and memory to host and execute the following kinds of system software identified as the web server 20, knowledge repository server 21, OWL 2 Web Ontology Language ("OWL2") reasoning engine 22, semantic mapping service 24a, and RDF population service 23a. A separate, computer-persistent, storage technology system hosts the knowledge system ontologies 25 and 22c, knowledge bases 21a, 21b, domain data metamodels or schemas 24, and domain data sources 23. The OWL2direct semantics 22a is explicitly defined in the OWL2 ontology language (DL) 22b, and its execution is performed by the OWL2 reasoning engine 22.

According to an embodiment, the web client 10 is configured to access the web server 20 in order to access web services. In addition, the web client 10 is also configured to access a plurality of knowledge bases via queries to the knowledge repository server 21. According to an embodiment, the server 21 provides (i) a storage of the system ontologies and the related ontology knowledge bases and (ii) a standard SPARQL service endpoint for accessing the ontologies and the ontology knowledge bases. For example, the server 21 may access the inferred knowledge base 21a, which is represented as resource description framework (RDF) triples, and may also access the domain asserted knowledge base 21b, which is described in asserted RDF triples. Further, the OWL2 reasoning engine 22, when executed by the appropriate system functions, enables a set of inferences to be made for the ontology knowledge bases, which will result in additional sets of facts, expressed in OWL/RDF triples, and, thus, offers insights into the possible direct semantic alignments between the proxy table ontology, the set of controlled domain vocabularies, and the set of domain ontologies. According to an embodiment, some of these possible direct semantic alignments may be presented to the user as choices to be selected and, once selected, will become part of the persistent store graph server (e.g., server 21) and ontology knowledge base (e.g., knowledge bases 21a or 21b). For example, as depicted in the figure, the reasoning engine 22 classifies the OWL2 ontology 25, which represents the domain knowledge 25a. Further, the reasoning engine 22 is executed consistent with the OWL2 direct semantics 22a and the OWL2 descriptive logic 22b. In addition, the reasoning engine 22 may also generate potential ontology designed domain inferences 22c. Further, a semantic mapping 24a may be mapped onto the OWL2 ontology 25. According to an embodiment, the semantic mapping 24a may be mapped from the schemas retrieved from the domain data metamodels or schemas 24. Further, the semantic mapping 24a may also be utilized to perform an RDF population service 23a on the domain data sources 23. The RDFs may then be exported to the appropriate knowledge base via the server 21.

Figure 2A:
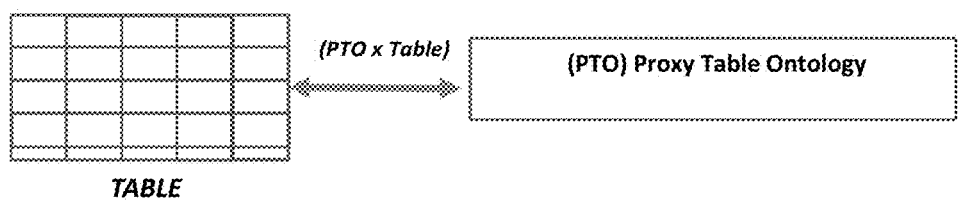
FIG. 2A is a diagram illustrating a mapping between a data table and a proxy table ontology according to an exemplary embodiment of the invention.

FIG. 2A is a diagram illustrating a mapping between a data table and a proxy table ontology according to an exemplary embodiment of the invention. According to an embodiment, each data table has a 2-dimensional structure that organizes content at the intersection of each row and column heading. Table content is interpreted by its structure and an understanding of background domain knowledge. Generally, rows and columns have labels—where such labels are vocabulary terms for a domain of interest and which are known to those knowledgeable about the domain. Table cells at intersecting rows and columns have an implicit domain context guiding the semantic interpretation of the meaning of its content by the meaning of the labels. According to an embodiment, the content of the table cells are interpreted as either class instances or data property values for class instances. Further, since a table has no explicit metadata describing the relationships between the columns for each row, by mapping table headings to ontology classes, the relationship between table columns may be semantically interpreted as either (i) object properties between class instances in two different columns or (ii) as a data property between a class instance in a column to a data value instance in another column.

According to an embodiment, in order to enable machine interpretation of the data table information structure, it is necessary to have a faithful representation of the table structure information (TPS) and its headings (TSH). A proxy table ontology (PTO) provides such a model of the table's structure, where the PTO's classes and properties describe the table headings, their relationships, and each cell's relationship to the table headings. According to an embodiment, the PTO may be expressed in the OWL2 ontology language. The PTO may also be rendered in a human-readable format. For example, as described in the expression below, the Table class can be represented in the OWL 2 RDF/XML rendering by defining the domain vocabulary of the proxy table ontology with a namespace http://kpmg/TableProxyOntology #, wherein the "#" symbol separates the universal resource identifier (URI) from the particular domain vocabulary, e.g., Table.

```
<!-- http://kpmg/TableProxyOntology#Table -->
<owl:Class rdf:about="http://kpmg/TableProxyOntology#Table">
    <rdfs:subClassOf rdf:resource="http://www.w3.org/2002/07/owl#Thing"/>
</owl:Class>
```

In this example, the first OWL language expression i.e., <!--http://kpmg/TableProxyOntology #Table-->, states that the expressions following the first expression define a resource #Table. The next OWL language expression, i.e., <owl:Class rdf:about="http://kpmg/TableProxyOntology #Table">, states that the resource #Table is an owl:Class. Further, the next OWL language expression, i.e., <rdfs: subClassOf rdf:resource="http:/www.w3.org/2002/07/owl #Thing"/>, states that the resource #Table is a subclass of owl #Thing. Lastly, the final OWL language expression, i.e., </owl:Class>, closes the set of the class definition. Further, according to an embodiment, the Table's contents, e.g., RowHeader, Row, Domain, Column, ColHeader, and Cell, may be defined with an OWL language namespace in a similar way.

According to an embodiment, for a simple elementary grid-like table, the following tuple defines the information components that are represented by an elementary table (e.g., faithfully represents information about its structure only):

$$Table(T)=(TPS,TSH,TC).$$

Figure 2B:
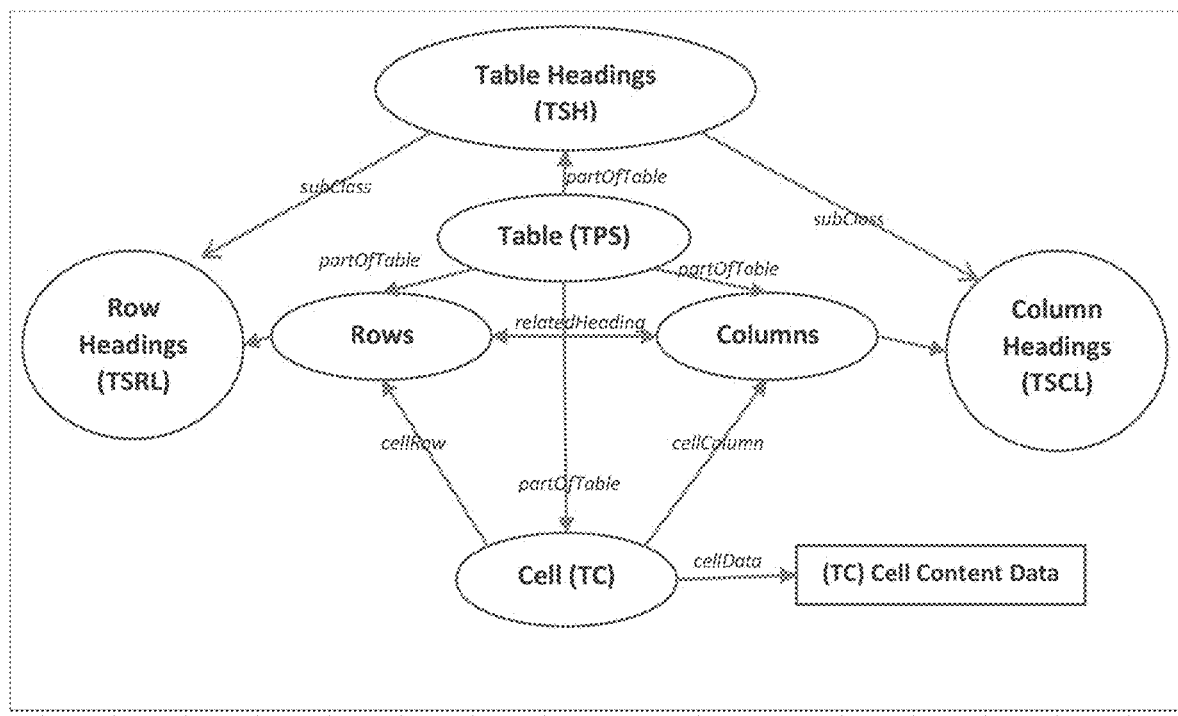
FIG. 2B is a diagram illustrating a proxy table ontology according to an exemplary embodiment of the invention.

According to an embodiment, the tuple for Table (T) represents knowledge about the table structure's headings (TSH) for rows (TSRL) and columns (TSCL), a set of relationships defining the table's physical structure (TPS) (which are unique for locating each table cell), and its cell content (TC). FIG. 2B illustrates the PTO ontology classes and properties which can represent the Table (T) and its components, while Table 1 identifies the PTO ontology components in FIG. 2B and their relationship to the components of a table structure.

TABLE 1

| Table Elements | OWL Ontology Element | Ontology Representation and Description |
|---|---|---|
| Table(T) | PTO OWL Class: Table(T) | Each table instance is asserted as a member of a Table OWL Class (Table(T)) |
| Core Table Components | PTO OWL Classes: Rows, Columns, Heading (TSH), Cells | Each realized instance of a specific table has asserted instances of Rows, Columns, Headings (TSH), and Cells Class |
| TSH Table Structure Headings, {Row Heading (TSRL), Column Heading (TSCL)} | PTO OWL SubClasses: Row Headings (TSRL), Column Headings (TSCL) | Each instance of a heading is asserted as a member of one of the TSH OWL subclasses, Row Headings (TSRL) or Column Headings (TSCL) defined by the OWL relation subClass |
| Table Instance Component Configuration | PTO OWL Object Property: partOfTable | Each instance of a Table(T) Class will be configured to have multiple partOfTable object property assertions to table component instances in their respective classes for Row Headings (TSRL), Column Headings (TSCL), Rows, Columns, and Cells |
| Table Row-Column Heading Structure Relationships | PTO OWL Object Properties: relatedHeading | The TPS is defined in the PTO ontology as a symmetrical object property representing assertions between an instance of the Rows Class and an instance of the Columns Class. relatedHeading |
| TC Table Cell | PTO OWL Class: Cells | Each Table Cell is asserted as an instance of a PTO OWL Class, Cells, and has a set of object property assertions to the row |

TABLE 1-continued

| Table Elements | OWL Ontology Element | Ontology Representation and Description |
|---|---|---|
| | | and column heading instances, and a data property asserting the value of the cell content |
| TC Table Cell Structure Context | PTO OWL Object Property: cellRow, cellColumn | Each Table Cell instance has a unique pair of object property definitions, one asserting a relationship to an instance of Rows Class, cellRow, and another asserting a relationship to an instance of a Columns class, cellColumn. This uniquely defines a context of interpretation about the meaning associated with a cell's content. |
| TC Table Cell Content | PTO OWL Data Property: cellData | A data property asserting the content value for each cell instance, cellData |

Further, as described above, a table structure's headings (TSH) comprise occurrences/instances of row and column labels, e.g., TSRL and TSCL, respectively.

TSRL,TSCL∈TSH.

Further, the table heading structure relations, as well as metadata for each relation, are defined by unique ordered pairs of row and column labels contained in the table structure ((TSRL, TSCL)∈TPS), specifically:

TPS={(tsrl$_i$,tscl$_j$)|tsrl$_i$∈TSRL,tscl$_j$∈TSCL)}.

In other words, the TPS corresponds to a set of ordered pairs of row and column headings, i.e., (tsrl$_i$, tscl$_j$), which define the table structure relations to be represented by a proxy table ontology, where tc$_{i,j}$ is the cell content at the intersection of each row and column heading defining by the ordered pair. In particular, tc$_{i,j}$ may be defined as:

tc$_{i,j}$=({content(tsrl$_i$,tscl$_j$)|tsrl$_i$∈TSRL,tscl$_j$∈TSCL),
(tsrl$_i$,tscl$_j$) ∈TPS,content(tsrl$_i$,tscl$_j$)∈TC).

According to an embodiment, the domain ontology tuple associated with the table may be defined as PTO=OD$_T$=(T, Do$_T$, C$_T$, E$_T$, Rc$_T$, Rd$_T$, I$_T$), where the semantic definitions are described in Table 2 below.

TABLE 2

| Table Elements Do$_T$ | PTO OWL Ontology Element Name | PTO Ontology Tuple Component PTO = OD$_T$ |
|---|---|---|
| Table (T) | PTO OWL Class: Table(T) | C$_T$ |
| Table Structure Headings (TSH), {Row Heading (TSRL), Column Heading} (TSCL) | PTO OWL SubClasses: Row Headings (TSRL), Column Headings (TSCL) | C$_T$ |
| Table Instance Component Configuration | PTO OWL Object Property: partOfTable | Rc$_T$ |
| Table Row-Column Heading Structure Relationships | PTO OWL Object Properties: relatedHeading | Rc$_T$ |
| Table Cell (TC) | PTO OWL Class: Cells | C$_T$ |
| Table Cell (TC) Structure Context | PTO OWL Object Property: cellRow, cellColumn | Rc$_T$ |
| Table Cell (TC) Content | PTO OWL Data Property: cellData | Rd$_T$ |

Figure 2C:
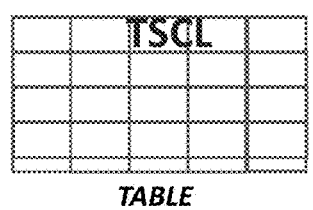
FIG. 2C is a diagram illustrating an alignment between the data table and the at least one controlled domain vocabulary according to an exemplary embodiment of the invention.

FIG. 2C is a diagram illustrating an alignment between the data table and at least one controlled domain vocabulary according to an exemplary embodiment of the invention. According to an embodiment, the system utilizes and manages a set of controlled domain vocabularies (CDVs). The CDVs define: (i) domain concepts (DC) having associated lexical properties (RL) relating preferred and alternate labels (DL) for each concept in a domain concept schema (DCS) and (ii) a small set of semantic relationships (RS) for defining broader, narrower, and matching relationships between domain concepts (DC) in the domain concept schema (DCS), which are each expressed using a simple knowledge organization system (SKOS) matching relationship language.

The following tuple identifies the CDV components:

CDV=(DCS,DC,DL,RL,RS).

Further, {dc|dc∈DC, DC∋DCS}, where dc is a domain concept in the set of domain concepts DC, and where the set of domain concepts DC are contained in a domain concept schema DCS. In addition, RL={(dc, dl)|dl∈DL, dc∋DC}, where dl is a domain concept label in the set of domain concept labels DL, and where the ordered pair (dc, dl) (i.e., instance of a domain concept dc and a domain label dl) are defined as paired members of the SKOS lexical relations RL associating the preferred and alternate label dl for domain concept dc. The SKOS lexical relation may be one of skos:prefLabel, skos:altLabel, or skos:hiddenLabel.

Further, in another embodiment, RS={(dc$_i$, dc$_j$)|dc$_i$∈DC, dc$_j$∈DC, i≠j}, where ordered pairs of concepts may be hierarchically related to each other in the same SKOS domain schemas DCS using the RS set of semantic relations. In addition, the SKOS taxonomic or matching relationships between domain concepts may be defined as:

RS={skos:narrower,skos:broader,skos:relatedMatch}.

According to an embodiment, the preferred and alternative labels are useful when generating or creating human-readable labels for each domain concept used in a knowledge organization system. These labels may provide the strongest clues as to the meaning of a SKOS concept in a domain since they are related to domain concept definitions. Further, the hidden labels may be useful when a user is interacting with a knowledge organization system. For example, if the user enters miss-spelled words when trying to find a relevant concept, the miss-spelled query can still be matched against a hidden label and, therefore, the user will still be able to find the relevant concept.

According to an embodiment, the following SKOS relationships enable the design of a hierarchical taxonomy for the CDV domain vocabulary label set DL and associated domain concepts DC:

broader definition($dl_i$,skos:broader $dl_j$|$dl_i \in DL, dl_j \in DL$, $dl_i \neq dl_j$)

narrower definition($dl_i$,skos:narrower $dl_j$|$dl_i \in DL$, $dl_j \in DL, dl_i \neq dl_j$), where, $dl_j$ is a broader (e.g., more general) label for $dl_i$ in the broader definition and a more-specific label in the narrower definition. Further, alternate labels for the table heading labels may be defined by using the following SKOS relationship (where $dl_j$ is a related match label for $dl_i$):

related Match definition($dl_i$,skos:relatedMatch $dl_j$|$dl_i \in DL, dl_j \in DL$).

The SKOS mapping properties are skos:closeMatch, skos:exactMatch, skos:broadMatch, skos:narrowMatch, and skos:relatedMatch. These properties are used to state mapping (i.e., alignment) links between SKOS concepts in different concept schemes DCS, where the links are inherent in the meaning of the linked concepts. Accordingly, matching relationships may be asserted between a table headings TSH of a data table and a CDV. The properties skos:broadMatch and skos:narrowMatch may be used to state a hierarchical mapping link between two concepts. The property skos:relatedMatch is used to state an associative mapping link between two concepts. The property skos:closeMatch is used to link two concepts that are sufficiently similar that they can be used interchangeably by some information retrieval applications. However, in order to avoid the possibility of "compound errors" when combining mappings across more than two concept schemes, skos:closeMatch is not declared to be a transitive property. The property skos:exactMatch is used to link two concepts, indicating a high degree of confidence that the concepts can be used interchangeably across a wide range of information retrieval applications. Further, skos:exactMatch is a transitive property and is also a sub-property of skos:closeMatch.

According to an embodiment, the possible semantic relationships between the labels of the table headings TSH and the labels DL of the CDV are defined in Table 3 below.

TABLE 3

| Matching Situation (Table × CDV) Labels | skos: relationship | Explanation |
|---|---|---|
| Labels are an exact match | {tsrl tscl} skos: exactMatch dl<br>{tsrl tscl} samt: CDVLabel "True" | The labels are literally the same |
| Labels represent synonyms of each other | {tsrl tscl} skos: exactMatch dl<br>{tsrl tscl} samt: CDVLabel "True" | The labels are synonyms, though with potential different surface forms (spellings) |
| Label of CDV is broader than label of table | {tsrl tscl} skos: broadMatch dl<br>{tsrl tscl} samt: CDVLabel "True" | The table label seems to match a hypernym relationship to another label in the CDV taxonomy. |
| Label of CDV is narrower than label of table | {tsrl tscl} skos: narrowMatch dl<br>{tsrl tscl} samt: CDVLabel "True" | The table label seems to match a hyponym relationship to another label in the CDV taxonomy. |
| No match | {tsrl tscl} samt: CDVLabel "False" | samt: CDVLabel data property relationship with value "False" is asserted by an algorithm when no CDV semantic relationship is discovered between a table label, {tsrl tscl} and any CDV label dl |

Further, according to an embodiment, the SKOS ontology representation of the semantic alignment of the data table and CDV terms may be defined as follows:

SA1=(PTO,TSH,CDV,DT,R1,SMR)

Specifically, SA1 represents a tuple identifying the elements used for defining a semantic alignment between the terms for the headings TSH of the proxy table ontology PTO and the terms DT in the CDV. Further, R1 (i.e., R1={($tsh_i$, $dt_j$)|($tsh_i$, $dt_j$)∈SMR, $tsh_i$∈TSH, $dt_j$∈DT}) defines the ordered pairs of terms ($tsh_i$, $dt_j$), which are asserted as members of one of the SKOS semantic matching relationships (SMR) (i.e., R1={($tsh_i$, $dt_j$)|($tsh_i$, $dt_j$)∈SMR, $tsh_i$∈TSH, $dt_j$∈DT}), where the broader set definition of TSH (i.e., TSH={TSRL, TSCL}) is used for the table headings to ensure that the semantic alignments are considered for both row and column headings (i.e., TSRL and TSCL, respectively). Further, according to an embodiment, the ranking of the semantic alignment of the table headings TSH with different CDVs can be based on an ordered evaluation of the percent coverage of TSH terms by pairs of terms in R1, ($tsh_i$, $dt_j$), and the ranking order of the SMR. For example, as described in Table 4 below, the semantic ranking value in the hierarchy of SMR relations can be based on (i) coverage of the tables headings by a CDV (i.e., Cov % (TSH)) and (ii) a weighted evaluation score representing percent of aligned tuples ($tsh_i$, $dt_j$).

TABLE 4

| SMR Relation | Logical Relation | Ranking Order | Weight |
|---|---|---|---|
| exactMatch | $tsh_i = dt_j$ | 1 | 4 |
| closeMatch | $tsh_i \sim dt_j$ | 2 | 3 |
| narrowMatch | $tsh_i \leq dt_j$ | 3 | 2 |
| broadMatch | $tsh_i \geq dt_j$ | 4 | 1 |

According to an embodiment, with the semantic alignment information R1 between the TSH terms of a table and the DT terms of each selected CDV, the CDV having the most semantic coverage of TSH terms in the table can be efficiently and effectively discovered.

Figure 2D:
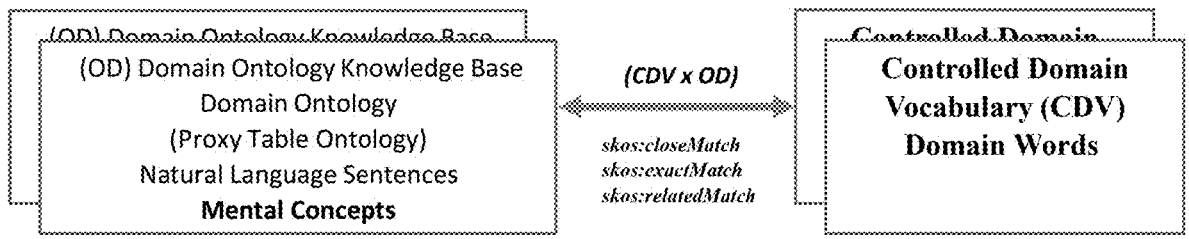
FIG. 2D is a diagram illustrating an alignment between at least one controlled domain vocabulary and at least one domain ontology according to an exemplary embodiment of the invention.

FIG. 2D is a diagram illustrating an alignment between at least one controlled domain vocabulary and at least one domain ontology according to an exemplary embodiment of the invention. Domain ontologies can explicitly represent a model of knowledge understandable by both human users and computers. Ontology classes can be semantically related to a domain's concepts (as defined by a SKOS concept scheme) with preferred and alternate labels. Ontology classes can represent both intensional domain concepts and existential domain concepts, where individuals are asserted or inferred using the semantic reasoning inference provided by the OWL ontology language. According to an embodiment, the ontology class can be semantically related to terms used for specific domain entities. Some of these relationships are specified as necessary and sufficient for intensional classes and, therefore, intensional domain concepts are defined in particular SKOS concept schemes. This enables the automatic classification of occurrences of domain "individuals" as members of a domain ontology class. In other words, the ontology model defines the meaning of a domain entity occurrence in the context of its overall model by the domain entity's relationships to other domain entities asserted as members of another ontology class. For example, an entity asserted as a "Borrower" in a table could be inferred as a "Participant" in a "Loan Agreement" due to the necessary and sufficient conditions for a "Loan Agreement" ontology class requiring a relationship asserted between a "Borrower" and a "Loan Agreement." Further, some of these relationships are optional and descriptive in nature and, as such, are not necessary, but do provide further clarifications about the domain entity. For example, the "Contact Information" for a "Borrower" and a "Lender" is useful but not necessary for defining the concept of a "Borrower" with respect to a "Loan Agreement" and "Lender" in a model.

Further, according to an embodiment, a domain ontology may be defined with the following tuple: OD=(Do, NS, C, E, Rc, Rd, I), where (i) OD is the domain ontology, (ii) Do is the domain of interest that the ontology represents knowledge about, (iii) NS is the unique namespace defining the IRI/URI for each ontology, (iv) C is the set of domain classes representing a mental concept that classifies entities/individual occurrences in the domain, (v) E is the set of entities or individuals that occur in the domain of interest, including real world physical objects (e.g., people, buildings, automobiles, etc.) as well as other kinds of occurrences that can be defined socially (e.g., situations, events, contracts, meetings, organizations, employment, inflation, etc.), (vi) Rc is the set of named binary object properties defined between domain classes which are used to assert relationships between the respective domain entities E, (vii) Rd is a set of data properties asserted between instances of a class and a data standard typed value (e.g., such as strings, integers, etc.), and (viii) I is the interpretation function that determines: (a) which domain entities E are asserted for each domain class C, (b) which entities are members of the ordered pairs of object properties Rc, and (c) which classes C are the subjects of the data properties Rd. The interpretation function may be implemented with a semantic extraction and alignment process for populating an ontology knowledge base.

As regards to domain classes C, they are socially-defined classes or domain concepts that are used to classify the domain individual entity occurrences E. The entity membership may be asserted through population of a knowledge base or inferred by the ontology class axioms. A class hierarchy may also be specified between some classes to reflect general-to-specific taxonomic relationships. Further, the ontology will reason appropriately about entity class membership in parent classes from assertions in child classes as follows: if an entity e2 is asserted as a member of a lower level class c2, i.e., e2∋c2, then e2 would also be inferred to be classified as a member in the higher classification c1 or (e2∋c1|c2⊏c1, e2∋c2). Further, each domain class $c_i$ may be defined as a member of the set of classes representing classifications of entities in a domain Do, i.e., C={$c_i$|($c_i \in C^{Do}$)}.

As regards to domain entities E, a set of domain entities, $E^{Do}$, include realization occurrences or individuals, $e_j$, which are classified by a domain concept $c_i \in C^{Do}$, where $E^{Do}$={$e_j$|($e_j \in c_i$, $c_i \in C^{Do}$)}. Each entity $e_j$ in the set of domain entities $E^{Do}$ is asserted (or inferred) to be a member of a domain class $c_i$, where the domain class $c_i$ is asserted to be a member of the set of domain classes $C^{Do}$.

As regards to the relationships between domain classes, Rc, there are many different kinds of relationships that can be defined between concepts, depending on the nature of the domain and the kind of knowledge about the domain that is of interest. The scope of the required knowledge of a domain with respect to semantic interpretation of a table will help guide the kinds of relationships that can be inferred in the semantic alignment of a table with a domain ontology. For example, in a Commercial Mortgage Loan Audit (CMLA) ontology, a domain concept "Loan Agreement" should have an ontology class property "hasComponents" to other concepts such as "Borrower," "Lender," "Guarantor," "Collateral," etc. This kind of relationship is an example of meronomy, a part-whole relationship. Each background knowledge domain will have commonly understood relationships between domain concepts that can be used to relate domain entities classified by these domain concepts. Some general property relationship examples include: (i) general-specific semantic taxonomic relationships, such as those defined in SKOS with broader/narrower relationships, (ii) part-whole relationships, such as those used for defining which components are constituent parts of a system, (iii) "isA" classification relationships, such as those defining the ontology class that a domain entity is a member of, and (iv) precedence-successor relationships, which are relationships defining sequences in a dimension, such as time (or a sequence of actions in a process). According to an embodiment, a set of ordered pair of domain related concepts ($c_i$, $c_j$) associated with relation Rc may be defined with: $Rc^{Do}$={($c_i$, $c_j$)|($c_i \in C^{Do}$, $c_j \in C^{Do}$, $c_i \neq c_j$)}.

As regards to the relationships between domain entities, Re, these entity relationships may be understood as subsets of concept relationships Rc defined as occurring between entities classified in different concepts, i.e., Re={(e1, e2)|Re∈Rc, Rc=(c1, c2), e2∈c2, e1∈c1}. In other words, the entity relationships are the same relationships as defined in Rc, but in this case are used to assert this relationship between two entities in the respective domain and range concepts/classes used to define the Rc relationship.

Further, as regards to the data properties of a domain entity, Rd, these relationships can be defined at the concept level C, and can be understood as a data attribute of an entity e. For example, assuming the concept was "person," the corresponding data attributes may be height and weight. Further, according to an embodiment, when domain entities are classified as members of a domain concept C, they can have data attributes considered with values unique to that individual. However, not all entities classified for a concept may actually have known data attribute values. For instance, the data may not be available or the data attribute may be optional due to the nature of the scope of the concept definition. According to an embodiment, Rd may be defined as Rd=(e1, v, dt|(e1∈c1), (v∈V), v typeOf dt), where v is member of a set of data attribute values V, e1 is classified by c1, v is asserted by the Rd data property as a data attribute value for entity e1 and of type dt, and dt is a type of data attribute DT (where DT={xsd datatypes}).

According to an embodiment, similar to the alignment between table headings TSH and the at least one CDV, SKOS mapping relationships may also be asserted between the at least one CDV and at least one domain ontology. In particular, the SKOS mapping relationships are asserted between the CDV concepts DC and the domain ontology class C. In other words, the domain concepts defined the CDV may be semantically mapped to an ontology class in the domain ontology.

Figure 2E:
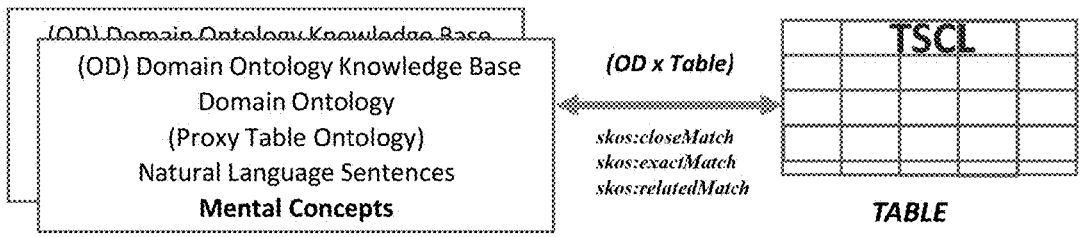
FIG. 2E is a diagram illustrating a mapping between the data table and the at least one domain ontology according to an exemplary embodiment of the invention.

FIG. 2E is a diagram illustrating a mapping between the data table and the at least one domain ontology according to an exemplary embodiment of the invention. According to an embodiment, because each domain ontology utilizes the terms of one or more CDVs as the labels for its model components, the discovery of the CDV having the closest semantic alignment to the data table will also identify the set of domain ontologies that utilize this CDV. With this linkage between the data table and the closest CDV, as well the domain ontologies that utilize this CDV, it is possible to identify the domain ontology that covers the subset of CDV terms that are semantically aligned with the table labels. In particular, according to an embodiment, the table column TSCL relationships of the data table can be mapped (i.e., using the SKOS mapping relationships) to one of the domain ontology class properties Rc or data properties Rd in the identified domain ontology. As regards to the relationship between the columns and ontology class properties, i.e., [(RLabel, CLabel_i), (Rlabel, CType_j)]×(Ca $Rc^{Do}$ Cb)], the cells in column i are related to the cells in column j by the ontology property $Rc^{Do}$, where each cell is classified by ontology classes Ca and Cb, respectively. Further, as regards to the relationship between the table columns, the first column is mapped to an ontology class, and the second column is mapped to a typed data value via an ontology data property, Rd [(RLabel, CLabel_i), (Rlabel, CType_j)]×(Ca $Rd^{Do}$(V, DT))].

Figure 2F:
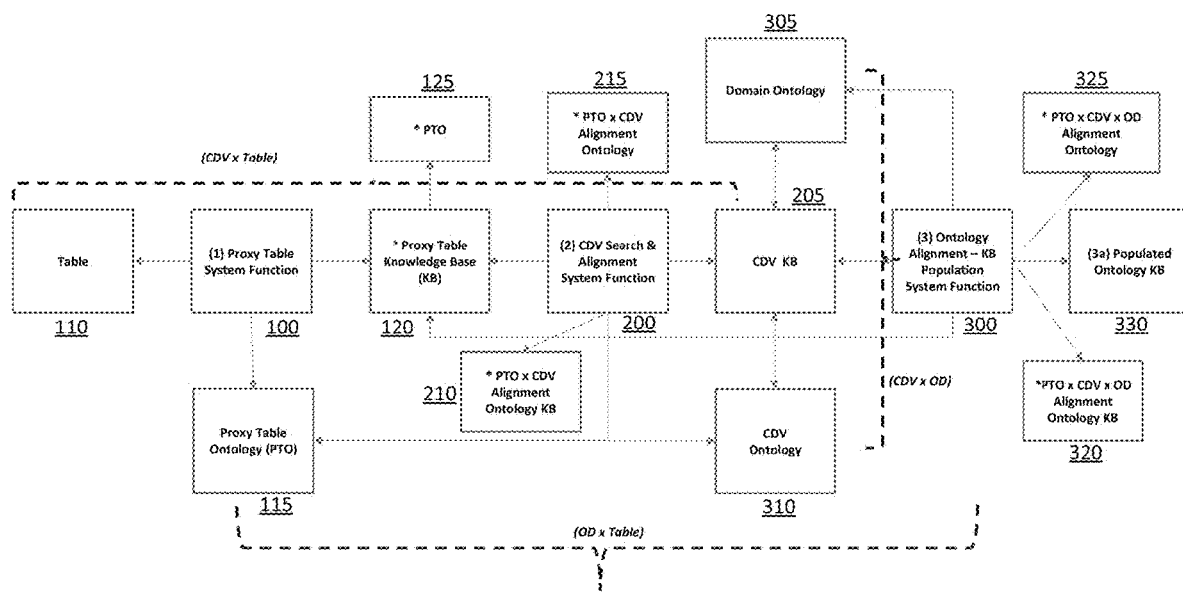
FIG. 2F is a diagram illustrating a process for semantically aligning a data table to a domain ontology according to an exemplary embodiment of the invention.

FIG. 2F is a diagram illustrating a process for semantically aligning a data table to a domain ontology according to an exemplary embodiment of the invention. As depicted in the figure, the process for aligning a data table to domain ontology is comprised of three main steps: (1) proxy table system function 100 (i.e., T×PTO), (2) CDV search and alignment system function 200 (i.e., T×PTO×CDV), and (3) domain ontology alignment—knowledge base system function 300. According to an embodiment, the function 100: (i) analyzes the physical structure of the table 110, (ii) identifies contextual domain, table headings, as well as unique indexing for the columns and rows of the table 110, and (iii) analyzes the table structure for alignment with the PTO 115. The dynamic semantic alignment results 125 are then stored as RDF triple assertions at the proxy table knowledge base 120. Accordingly, the semantic alignment results 125 may be accessed for this and other semantic alignment processes when necessary. The function 200 searches a managed pool of CDVs (i.e., in the CDV knowledge base 205) covering vocabularies of different domains for matches with the table headings asserted in the PTO 125 while considering (i) the lexical definitions of the terms and their semantic taxonomic relationships defined in the CDV and (ii) the context of each cell in the table structure. Further, because the CDV has synonyms as well narrower and broader terms in its vocabulary in the taxonomic hierarchy, the CDV provides multiple opportunities for semantic alignment with the PTO 125 headings. Further, according to an embodiment, the dynamic alignment results 215 are stored in a PTO×CDV alignment ontology knowledge base 210, where they may be access for this and other semantic alignment processes. The function 300 searches the closest chain of mappings between the domain ontologies 305 and the CDV ontologies 310 based on the terms found in the pool of one or more CDVs in step 200 and represents this knowledge about potential domain ontology OD alignments 325 in a CDV×OD alignment ontology knowledge base 320. Further, similar to the dynamic alignment results 125 and 215, the potential domain ontology OD alignments 325 may be accessed for later usage by this and other semantic alignment processes. Lastly, as depicted by populated ontology KB 330, once the chain of alignments is approved by a user, the system will populate the actual table content into the final domain ontology knowledge base under control of the user.

The relationship between the generic ontology knowledge system illustrated in FIG. 1 and the unique functions illustrated of the semantic alignment system in FIG. 2F are correlated in Table 5 below. For example, each of the three primary unique functions 100, 200, and 300 of the semantic alignment system in FIG. 2F implements both of the semantic mapping service 24a and the RDF population service 23a of the generic ontology knowledge system in FIG. 1. Further, the semantic alignment ontologies 115, 215, 305, 310, and 325 are classified with OWL2 Ontology 25 in the generic ontology knowledge system. In addition, the semantic alignment system ontology knowledge bases 120, 205, 210, 320, and 330 in FIG. 2F are classified as domain knowledge bases (i.e., both asserted 21b and inferred 21a) in the generic ontology knowledge system in FIG. 1.

TABLE 5

| FIG. 1 | FIG. 2F |
| --- | --- |
| Semantic mapping service 24a and RDF population service 23a | Proxy table system function 100, CDV search & alignment system function 200, domain ontology alignment—knowledge base system function 300 |
| OWL2 Ontology 25 | Proxy table ontology (PTO) 115, PTO × CDV alignment ontology 215 (i.e., dynamic alignment results), domain ontology 305, CDV ontology 310, PTO × CDV × OD alignment ontology 325 (i.e., potential domain ontology OD alignments) |
| Domain asserted knowledge base (RDF triples) 21b & inferred knowledge base (RDF triples) 21a | Proxy table knowledge base (KB) 120, PTO × CDV alignment ontology KB 210, CDV KB 205, PTO × CDV × OD alignment ontology KB 320, populated ontology KB 330 |

According to an embodiment, the web client 10 is configured to access the web server 20 in order to access web services supported by specific alignment system functions 100, 200, and 300. In addition, the web client 10 is also configured to access a plurality of knowledge bases 120, 205, 210, 320, and 330 via queries to the knowledge repository server 21. Further, the server 21 provides a storage of the system ontologies 115, 305, 310 and 325 and the related ontology knowledge bases. Further, the OWL2 reasoning engine 22, when executed by the appropriate system functions, enables a set of inferences to be made for the ontology knowledge bases 120, 205, 210, 320 and 330, which will result in additional sets of facts, expressed in OWL/RDF triples, and, thus, offers insights into the possible direct semantic alignments between the proxy table ontology 115, the set of controlled domain vocabularies KB 205, and the set of domain ontologies 305.

According to an embodiment, the generic ontology knowledge system provides services 24a and 23a to a user's web client 10 via software hosted on the web server 20. These services provide the user an ability to select a table, e.g., table 110 in FIG. 2F, to semantically align to a domain in the domain data sources 23. The user can interact with the web client 10 to cause the semantic alignment system to execute services 23*a* and 24*a*, as currently embodied in functions 100, 200, and 300 of FIG. 2F, in a serial fashion to (i) create a proxy table knowledge base 120, (ii) align the proxy table knowledge base 120 with controlled domain vocabularies using the CDV search and alignment system function 200, (iii) storing this second alignment in the PTO×CDV alignment knowledge base 210, (iv) semantically aligning the second alignment with the domain ontology 305 with the domain ontology alignment—KB population system function 300, and (v) storing and asserting the results of the function 300 in the PTO×CDV×OD alignment ontology KB 320. Then, once the final semantic alignment step is complete, the system will populate, row by row, the data from the table 110 into the populated ontology KB 330.

According to an embodiment, the semantic alignment process can be performed either manually or semi-automatically. As regards to the manual process, a user may manually select the semantic mapping relationships between the table row and column heading labels (i.e., potentially rendered in a proxy table ontology) and the lexical properties labelling the domain concepts defined in a selected CDV concept schema. In particular, the user may identify those table heading labels and controlled vocabulary labels having the closest lexical and semantic relationships to the concepts in the CDV. The system may then (i) identify the relevant domain ontologies associated with the selected controlled domain vocabularies and (ii) select the domain ontology with classes that are semantically closest to the CDV concepts that were mapped to table headings. As regards to the semi-automatic process, the system may automatically discover and recommend (e.g., present) to a user the closest semantically CDVs covering the heading labels of the table physical structure (TPS) having a structure of headings or labels (TSH). Then, after a user selects one or more CDVs recommended by the system, a matching relationship may be automatically defined between each table heading label and a CDV concept label using a SKOS matching relationship, e.g., skos:relatedLabels. The user can then select which of the recommended CDVs to persist. According to another embodiment, assuming the semantic alignment mapping between the CDVs and the domain ontologies has already been previously defined, the system may discover and provide related domain ontologies (OD') for each candidate CDV selected by the user, wherein each related domain ontology may have a set of ontology terms (OT) within the selected CDV that semantically covers all of the table headings (TSH). Further, the user may be given the capability to persist the most relevant semantic mapping for the discovered domain ontology.

According to an embodiment, a recursive semantic alignment can be implemented in order to semantically align a data table and its contents to multiple controlled domain vocabularies and multiple domain ontologies in a managed population of knowledge assets using multiple alignment paths. Each alignment path can be discovered at the domain concept level and the table structure heading level for columns or rows. According to an embodiment, after an initial semantic alignment path is determined between a table header, a domain vocabulary concept, and a domain ontology, the path may be used again for the next table header alignment. In particular, it can be used for testing the potential semantic alignment of the next table header with the same target domain vocabulary but with a different domain vocabulary concept. According to an embodiment, if the test is successful, the domain ontology for the previous path may be used in order to find an aligned domain ontology class with the new domain vocabulary concept. If the ontology class alignment is successful, then this new path is persisted for the set of semantic alignment paths for this table. However, if the ontology class alignment is not successful, then the asserted relationship from the new domain vocabulary concept must have a different associated domain ontology and domain class, which forms the rest of the path that may be persisted. Further, if the previous domain vocabulary does not semantically align with the terms of the table header, then another domain vocabulary is tested and the whole process of finding a semantically aligned path for this table header executes in the same manner as the first table header. In this regard, if any semantic alignment to a domain vocabulary concept fails, the user is notified and the process continues with another table header. The recursive process includes: (i) progressing from table header to table header, (ii) persisting all discovered semantically aligned paths, and (iii) reusing previous knowledge assets among previous discovered paths for its alignment testing.

Further, according to an embodiment, users may have the flexibility to select which subsets of the population of controlled domain vocabularies and domain ontologies to utilize in the semantic alignment processes.

Further, the semantic alignment system may store the semantic alignment paths between the data tables and the corresponding controlled domain vocabularies and domain ontologies in a memory. According to an embodiment, the stored semantic alignment paths can be reused for alignment for another table including the same structure and headings. Further, even if the table heading terms are different, the stored semantic alignment paths are still checked to determine if alternate labels match the table's headings. Accordingly, if a match occurs, the previously-stored semantic alignment path can be reused for this table heading. However, if there is no match, then another semantic alignment path must be created for this table heading.

Further, according to another embodiment, because (i) all possible semantic alignment paths are found through the population of domain vocabulary concepts and the subsequent related domain ontology classes and (ii) the most frequent domain vocabulary is used along with the most frequent domain ontology, the semantic alignment system may also use the domain ontology and its property relationships between domain classes to discover potential relationships between the associated table headers described in the proxy table ontology.

FIG. 3A is a diagram illustrating a data table according to an exemplary embodiment of the invention. As depicted in the figure, the example data table includes information about a particular domain, e.g., loans. For example, the first row header contains the column header labels (e.g., Loan, Borrower, Lender, Collateral, and Loan Amount). Further, the first column identifies unique identifies for each loan, e.g., L001, L002, L003, and L004. In addition, the other columns in each of the rows contains distinct information associated with each loan. Further, the cell content type may be contextually identified by each of the column headers.

FIG. 3B is a diagram illustrating another data table according to an exemplary embodiment of the invention. Similar to FIG. 3A, the data table in FIG. 3B includes information about loans. For example, the first row header contains the column header labels (e.g., Loan, Loan Agreement, Guarantor, and Secured). Further, the first column identifies unique identities for each loan, e.g., L001, L002, L003, and L004.

Figure 4A:
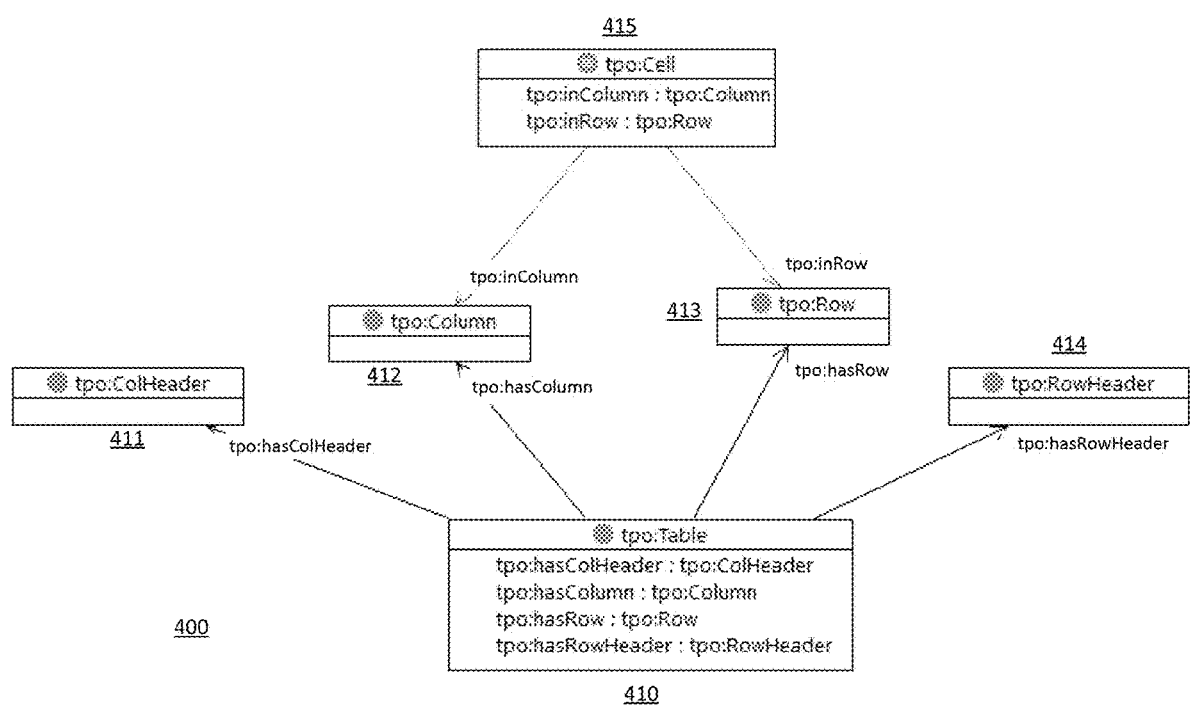
FIG. 4A is a diagram illustrating a proxy table ontology according to another exemplary embodiment of the invention.

FIG. 4A is a diagram illustrating a proxy table ontology according to another exemplary embodiment of the invention. As described above, the proxy table ontology 400 provides a model of the table 410's structure, where the proxy table ontology 400's classes and properties describe the table headings (e.g., column header 411 and row header 414), their relationships, and each cell 415's relationship to the table headings. For example, as depicted in the figure, each cell 415 corresponds to a particular column 412 and a particular row 413.

Figure 4B:
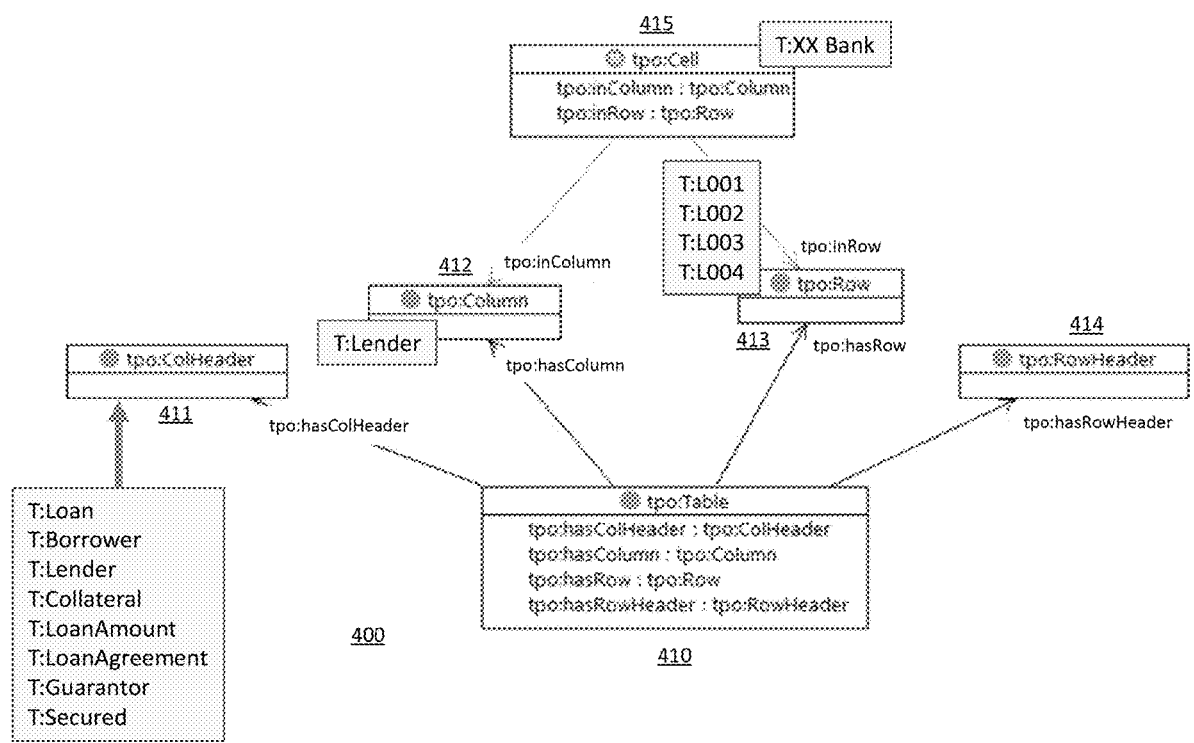
FIG. 4B is a diagram illustrating a mapping of the data table in FIG. 3A to the proxy table ontology in FIG. 4A according to an exemplary embodiment of the invention.

FIG. 4B is a diagram illustrating a mapping of the data table in FIG. 3A to the proxy table ontology in FIG. 4A according to an exemplary embodiment of the invention. For example, as depicted in the figure, the column header 411 can be one of "Loan," "Borrower," "Lender," "Collateral," "LoanAmount," "LoanAgreement," "Guarantor," and "Secured." Further, "Lender" may be mapped to the column 412. "XX Bank" may be mapped to the cell 415. Further, the row 413 may be one of "L001," "L002," "L003," and "L004." Further, in this example, there are no row headers.

Figure 4C:
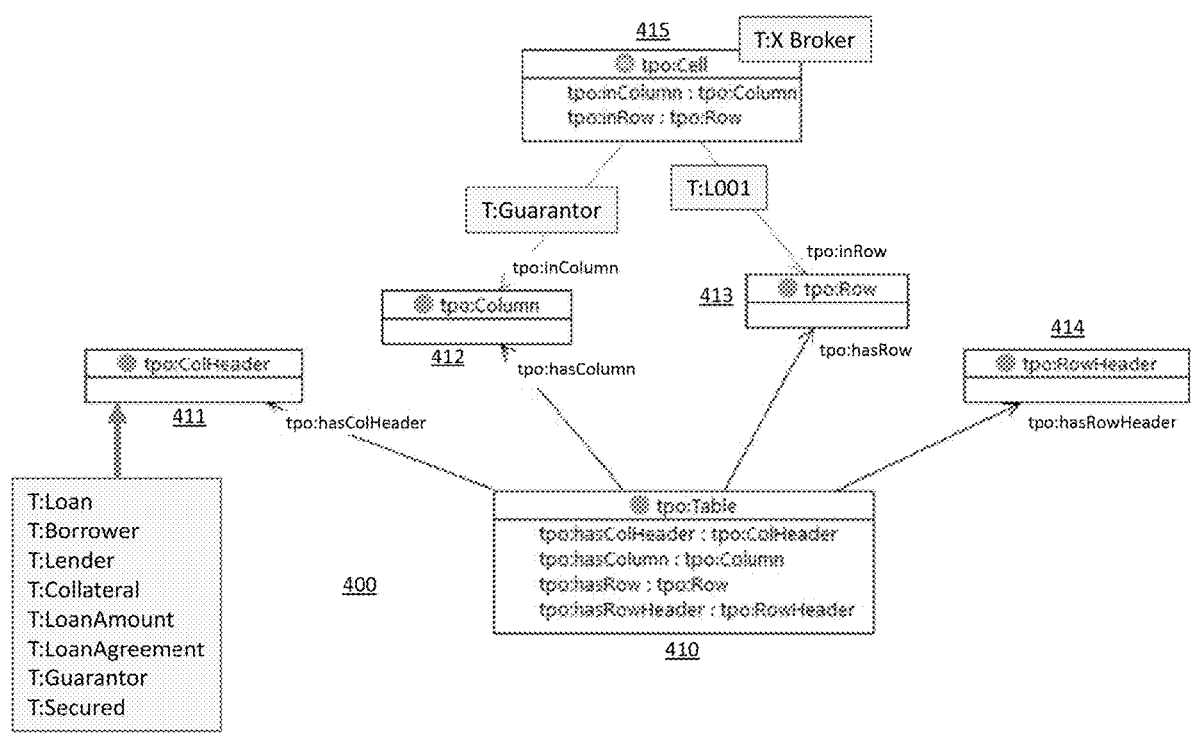
FIG. 4C is a diagram illustrating a mapping of the data table in FIG. 3B to the proxy table ontology in FIG. 4A according to an exemplary embodiment of the invention.

FIG. 4C is a diagram illustrating a mapping of the data table in FIG. 3B to the proxy table ontology in FIG. 4A according to an exemplary embodiment of the invention. Similar to FIG. 4B, the column header 411 can be one of "Loan," "Borrower," "Lender," "Collateral," "LoanAmount," "LoanAgreement," "Guarantor," and "Secured." Further, "Guarantor" may be mapped to the column 412. "Broker" may be mapped to the cell 415. Further, "L001" may be mapped to the row 413.

Figure 4D:
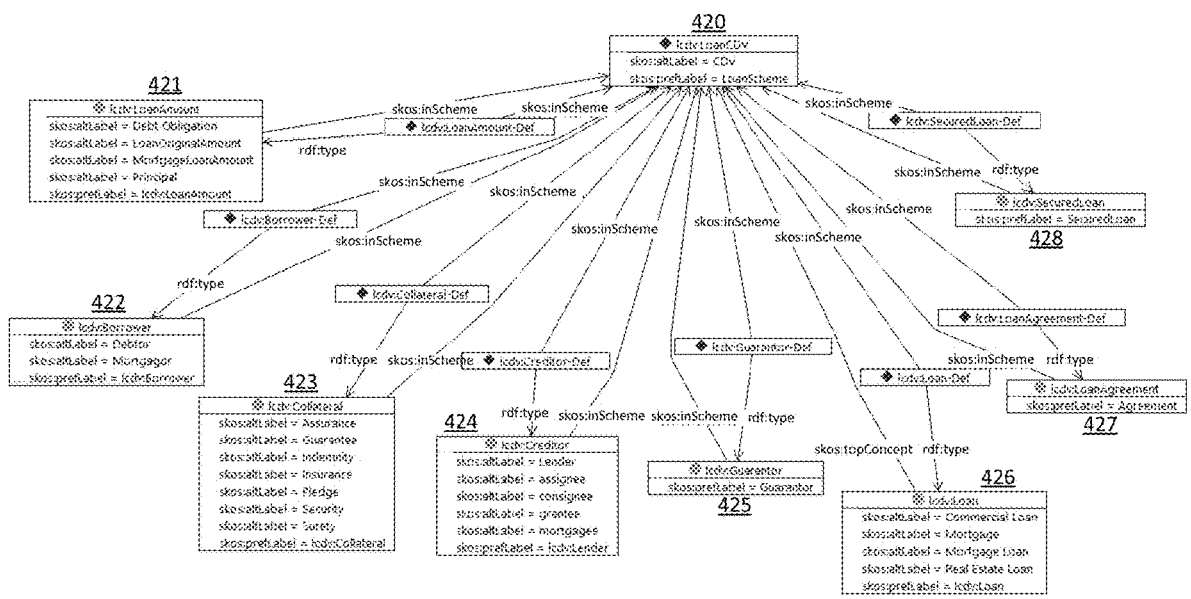
FIG. 4D is a diagram illustrating a controlled domain vocabulary according to an exemplary embodiment of the invention.

FIG. 4D is a diagram illustrating a controlled domain vocabulary according to an exemplary embodiment of the invention. In particular, the diagram depicts the controlled domain vocabulary 420 for a "loan" domain. For example, the controlled domain vocabulary 420 includes preferred and alternate labels for the following loan terms: "LoanAmount" 421, "Borrower" 422, "Collateral" 423, "Creditor" 424, "Guarantor" 425, "Loan" 426, "LoanAgreement" 427, and "SecuredLoan" 428.

Figure 4E:
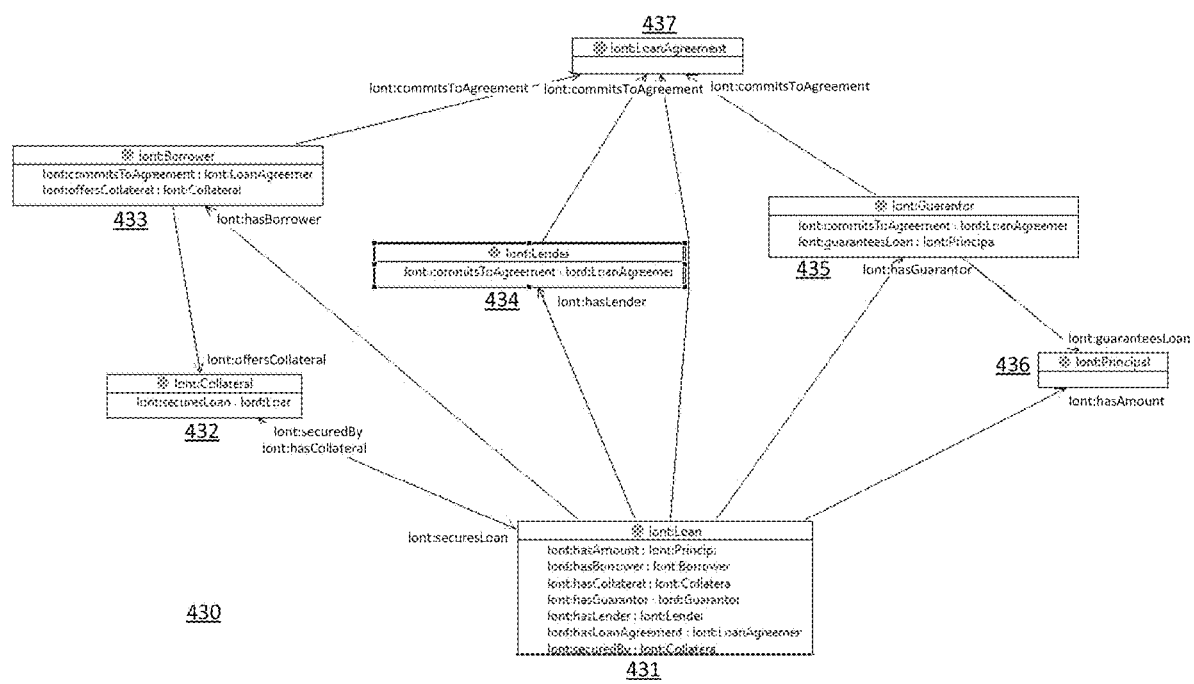
FIG. 4E is a diagram illustrating a domain ontology according to an exemplary embodiment of the invention.

FIG. 4E is a diagram illustrating a domain ontology according to an exemplary embodiment of the invention. As depicted in the figure, the domain ontology 430 represents the ontological relationships between the components (e.g., "Collateral" 432, "Borrower" 433, "Lender" 434, "Guarantor" 435, "Principal" 436, and "LoanAgreement" 437) of a loan 431.

Figure 4F:
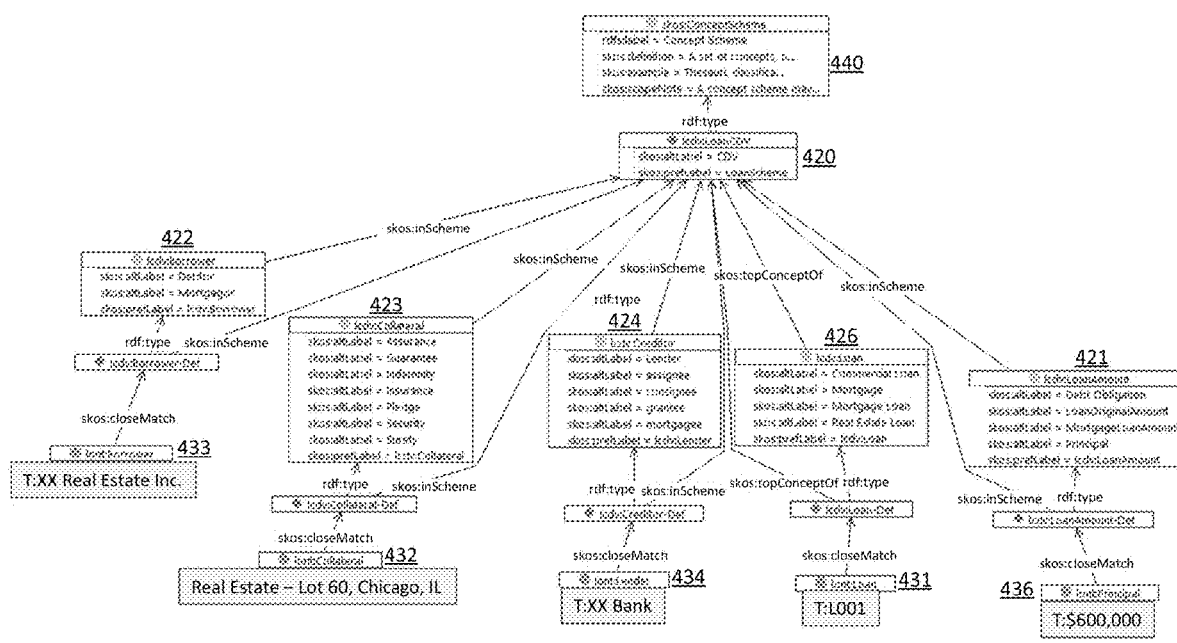
FIG. 4F is a diagram illustrating a mapping of the domain ontology in FIG. 4E to the controlled domain vocabulary in FIG. 4D according to an exemplary embodiment of the invention.

FIG. 4F is a diagram illustrating a mapping of the domain ontology in FIG. 4E to the controlled domain vocabulary in FIG. 4D according to an exemplary embodiment of the invention. In particular, as depicted in the figure, the mapping is performed with the SKOS mapping relationships functions 440. Accordingly, based on the SKOS mapping relationships function 440, it can be determined that: "Borrower" 433 of the domain ontology 430 matches "Borrower" 422 of the controlled domain vocabulary 420, "Collateral" 432 of the domain ontology 430 matches "Collateral" 423 of the controlled domain vocabulary 420, "Lender" 434 of the domain ontology 430 matches "Creditor" 424 of the controlled domain vocabulary 420, "Loan" 431 of the domain ontology 430 matches "Loan" 426 of the controlled domain vocabulary, and "Principal" 436 of the domain ontology 430 matches "LoanAmount" 421 of the controlled domain vocabulary 420. Further, the figure also depicts the corresponding data table elements of FIG. 3A associated with the matched domain ontology 430 components. In particular, "XX Real Estate Inc." is associated with "Borrower" 433, "Real Estate—Lot 60, Chicago, Ill." is associated with "Collateral" 432, "XX Bank" is associated with "Lender" 434, "L001" is associated with "Loan" 431, and "$600,000" is associated with "Principal" 436. In other words, the matched domain ontology 430 components are associated with the elements of the first, non-header, row in the data table of FIG. 3A.

Figure 4G:
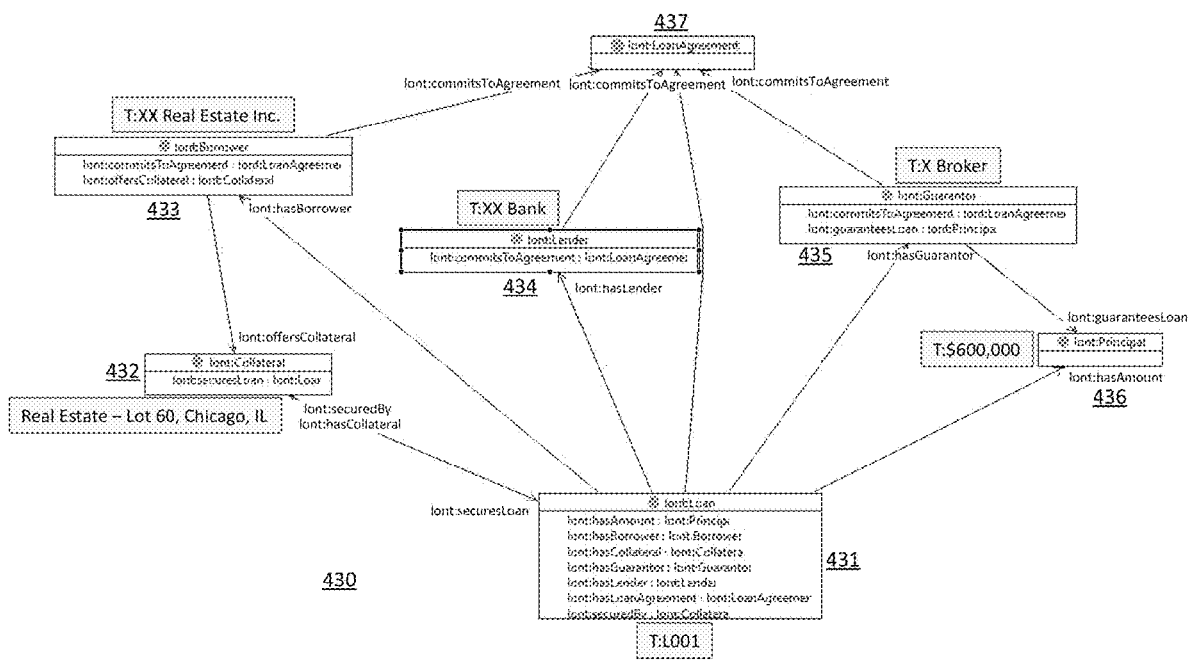
FIG. 4G is a diagram illustrating a mapping of the data table in FIG. 3A to the domain ontology in FIG. 4E according to an exemplary embodiment of the invention.

FIG. 4G is a diagram illustrating a mapping of the data table in FIG. 3A to the domain ontology in FIG. 4E according to an exemplary embodiment of the invention. In particular, the first, non-header, row in the data table of FIG. 3A is mapped to the corresponding components in the domain ontology 430.

Figure 5:
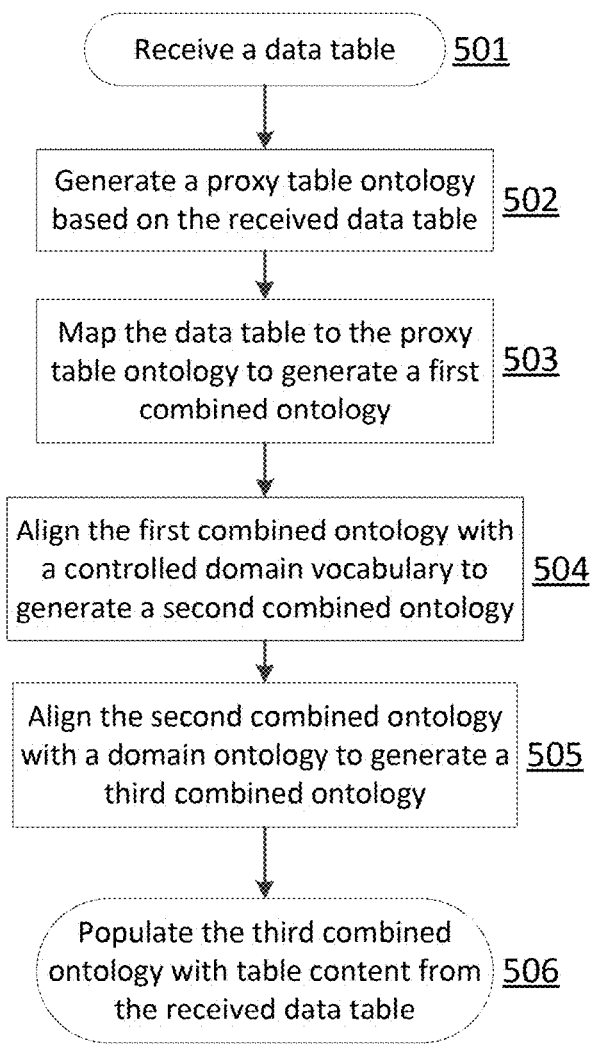
FIG. 5 is a diagram illustrating a method for semantically aligning a data table to a domain ontology according to an exemplary embodiment of the invention.

FIG. 5 is a diagram illustrating a method for semantically aligning a data table to a domain ontology according to an exemplary embodiment of the invention. In a first step, e.g., step 501, the processor 22 receives a data table. Then, in step 502, the processor 22 generates a proxy table ontology based on the received data table. According to an embodiment, the proxy table ontology represents a physical syntactical structure of the data table, wherein the physical syntactical structure identifies headings associated with columns and rows of the data table. Then, in step 503, the processor 22 maps the data table to the proxy table ontology to generate a first combined ontology. In particular, labels associated with a plurality of data cells of the data table are mapped to the identified headings. Then, in step 504, the processor 22 aligns the first combined ontology with a controlled domain vocabulary to generate a second combined ontology, wherein the aligning includes semantically matching the identified headings with corresponding labels in the controlled domain vocabulary. Then, in step 505, the processor 22 aligns the second combined ontology with a domain ontology to generate a third combined ontology, wherein the aligning includes semantically mapping a domain concept defined in the controlled domain vocabulary to an ontology class defined in the domain ontology. Lastly, in step 506, the processor 22 populates the third combined ontology with table content from the received data table.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. For example, although the disclosure has been directed primarily to automated grading of commercial mortgage loans, it can be used in connection with automated grading of other types of loans, and to automated analysis of other types of contracts and other legal or business documents, for example. The system is a general approach to semantically aligning any table with a corresponding domain ontology regardless of the industry or application.

The system described above can be implemented with servers and other computing devices in various configurations. The various servers and computing devices may use software to execute programs to execute the methods described above. Various embodiments of the invention also relate to the software or computer readable medium containing program instructions for executing the above described methods for automated the semantic alignment between a table, associated controlled domain vocabularies and one or more domain ontologies and associated knowledge bases.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers and personal computers described above and in the drawings may be stored and cataloged in one or more graph servers consisting of one or more ontology knowledge bases, which may comprise or interface with a searchable knowledge base and/or a cloud knowledge base. The knowledge bases may comprise, include or a W3C standard service interface, SPARQL which W3C specification defines the syntax and semantics of the SPARQL query language for RDF. According to an embodiment, the results of SPARQL queries can be result sets or RDF graphs. The knowledge bases may comprise a single knowledge base or a collection of knowledge bases. In some embodiments, the databases may comprise a file management system, program or application for storing and maintaining data and information used or generated by the various features and functions of the systems and methods described herein.

Communications networks connect the various computing devices described above and may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for aligning a data table to a domain ontology, the system comprising:
a processor and a memory to store instructions, wherein the instructions executed by the processor are configured to:
receive the data table;
analyze a physical structure of the data table;
identify one or more contexts for the data table, table headings, and unique indexing for each of the columns and rows of the data table;
generate a proxy table ontology, based on the analysis of the physical structure of the data table and the identification of one or more contextual domain, table headings, and unique indexing for each of the columns and rows of the data table, comprising a machine readable model of table structure information and table heading information for the received data table, as well as one or more relationships between table headings of the received data table, and a relationship between each data table cell and the table headings of the received data table, wherein the machine readable model comprises:
one or more row labels and one or more column labels representing subclasses of the table heading information; and
one or more unique ordered pairs of row and column headings corresponding to the table structure information that defines: (i) one or more relationships between the one or more row labels and the one or more column labels, (ii) metadata for each of the one or more relationships, and (iii) content of a cell from the received data table;
align the data table with the proxy table ontology by mapping the data table to the proxy table ontology to generate a first combined ontology, wherein each data cell of the data table is mapped to the corresponding one or more column label and the one or more row label;
store the results of aligning the data table with the proxy table ontology as resource description framework triple assertions;
generate a second combined ontology by:
searching a managed pool of controlled domain vocabularies (CDV) from a CDV knowledge base, where the managed pool of CDVs cover vocabularies of one or more different domains for matches with the table headings in the proxy table ontology, the matching comprising consideration of lexical definitions of one or more terms in each CDV and a semantic taxonomic relationship defined in each CDV, as well as a context for each cell of proxy table ontology; and aligning the first combined ontology with a CDV from the managed pool of CDVs, the CDV defining (i) a domain concept schema comprising one or more domain concepts each with a plurality of lexical properties relating to one or more preferred and alternate labels for each domain concept, and (ii) a set of semantic relationships for defining one or more relationships between the one or more domain concepts by semantically matching each of the one or more row labels and one or more column labels with one or more corresponding vocabulary terms in the controlled domain vocabulary based on the set of semantic relationships;

align the second combined ontology with the domain ontology to generate a third combined ontology, wherein the aligning includes semantically mapping a domain concept defined in the controlled domain vocabulary to an ontology class defined in the domain ontology; and populate the third combined ontology with table content from the received data table.

2. The system of claim 1, wherein the processor is an OWL 2 Web Ontology
Language reasoning engine.

3. The system of claim 1, wherein the aligning of the first combined ontology with the controlled domain vocabulary includes asserting simple knowledge organization system (SKOS) mapping relationships between the table headings and the ontology class defined in the domain ontology.

4. The system of claim 1, wherein the aligning of the second combined ontology with the domain ontology includes asserting simple knowledge organization system (SKOS) mapping relationships between the domain concept defined in the controlled domain vocabulary and the corresponding labels in the controlled domain vocabulary.

5. The system of claim 1, wherein the controlled domain vocabulary is selected out of a plurality of controlled domain vocabularies based on a semantic coverage of the table headings.

6. The system of claim 5, wherein the control domain vocabularies with the highest semantic coverage of the table headings are automatically discovered and presented to a user for selection.

7. The system of claim 1, wherein the controlled domain vocabulary defines a plurality of terms in the domain ontology.

8. The system of claim 1, wherein the first, second, and third combined ontologies are stored as resource description framework triple assertions in respective ontology knowledge bases.

9. The system of claim 1, wherein the third combined ontology is populated with table content from the received data table upon receiving user approval for at least one of the first, second, and third combined ontologies.

10. A method for aligning a data table to a domain ontology, the method comprising:
receiving, at a processor, the data table;
analyzing a physical structure of the data table;
identifying one or more contexts for the data table, table headings, and unique indexing for each of the columns and rows of the data table;
generating, with the processor, a proxy table ontology, based on the analysis of the physical structure of the data table and the identification of one or more contextual domain, table headings, and unique indexing for each of the columns and rows of the data table, comprising a machine readable model of table structure information and table heading information for the received data table, as well as one or more relationships between table headings of the received data table, and a relationship between each data table cell and the table headings of the received data table, wherein the machine readable model comprises:
one or more row labels and one or more column labels representing subclasses of the table heading information; and
one or more unique ordered pairs of row and column headings corresponding to the table structure information that defines: (i) one or more relationships between the one or more row labels and the one or more column labels, (ii) metadata for each of the one or more relationships, and (iii) content of a cell from the received data table;
aligning the data table with the proxy table ontology by mapping, with the processor, the data table to the proxy table ontology to generate a first combined ontology, wherein each data cell of the data table is mapped to the corresponding one or more column label and the one or more row label;
storing the results of aligning the data table with the proxy table ontology as resource description framework triple assertions;
generating a second combined ontology by:
searching a managed pool of controlled domain vocabularies (CDV) from a CDV knowledge base, where the managed pool of CDVs cover vocabularies of one or more different domains for matches with the table headings in the proxy table ontology, the matching comprising consideration of lexical definitions of one or more terms in each CDV and a semantic taxonomic relationship defined in each CDV, as well as a context for each cell of proxy table ontology; and
aligning, with the processor, the first combined ontology with a CDV from the managed pool of CDVs, the CDV defining (i) a domain concept schema comprising one or more domain concepts each with a plurality of lexical properties relating to one or more preferred and alternate labels for each domain concept, and (ii) a set of semantic relationships for defining one or more relationships between the one or more domain concepts by semantically matching each of the one or more row labels and one or more column labels with one or more corresponding vocabulary terms in the controlled domain vocabulary based on the set of semantic relationships;
aligning, with the processor, the second combined ontology with the domain ontology to generate a third combined ontology, wherein the aligning includes semantically mapping a domain concept defined in the controlled domain vocabulary to an ontology class defined in the domain ontology; and
populating, with the processor, the third combined ontology with table content from the received data table.

11. The method of claim 10, wherein the aligning of the first combined ontology with the controlled domain vocabulary includes asserting simple knowledge organization system (SKOS) mapping relationships between the table headings and the ontology class defined in the domain ontology.

12. The method of claim 10, wherein the aligning of the second combined ontology with the domain ontology includes asserting simple knowledge organization system (SKOS) mapping relationships between the domain concept defined in the controlled domain vocabulary and the corresponding labels in the controlled domain vocabulary.

13. The method of claim 10, wherein the controlled domain vocabulary is selected out of a plurality of controlled domain vocabularies based on a semantic coverage of the table headings.

14. The method of claim 13, wherein the control domain vocabularies with the highest semantic coverage of the table headings are automatically discovered and presented to a user for selection.

15. The method of claim 10, wherein the controlled domain vocabulary defines a plurality of terms in the domain ontology.

16. The method of claim 10, wherein the first, second, and third combined ontologies are stored as resource description framework triple assertions in respective ontology knowledge bases.

17. The method of claim 10, wherein the third combined ontology is populated with table content from the received data table upon receiving user approval for at least one of the first, second, and third combined ontologies.

18. A system for aligning a data table to a domain ontology, the system comprising:
a client device, wherein the client device is configured to receive the data table;
at least one server, wherein the at least one server is configured to store a plurality of domain ontologies and the corresponding ontology knowledge bases; and
a processor and a memory to store instructions, wherein the instructions executed by the processor are configured to:
receive the data table from the client device;
analyze a physical structure of the data table;
identify one or more contextual domain, table headings, and unique indexing for each of the columns and rows of the data table;
generate a proxy table ontology, based on the analysis of the physical structure of the data table and the identification of one or more contextual domain, table headings, and unique indexing for each of the columns and rows of the data table, comprising a machine readable model of table structure information and table heading information for the received data table, as well as one or more relationships between table headings of the received data table, and a relationship between each data table cell and the table headings of the received data table, wherein the machine readable model comprises:
one or more row labels and one or more column labels representing subclasses of the table heading information; and
one or more unique ordered pairs of row and column headings corresponding to the table structure information that defines: (i) one or more relationships between the one or more row labels and the one or more column labels, (ii) metadata for each of the one or more relationships, and (iii) content of a cell from the received data table;
align the data table with the proxy table ontology by mapping the data table to the proxy table ontology to generate a first combined ontology, wherein each data cell of the data table is mapped to the corresponding one or more column label and the one or more row label;
store the results of aligning the data table with the proxy table ontology as resource description framework triple assertions;
generate a second combined ontology by:
searching a managed pool of controlled domain vocabularies (CDV) covering vocabularies of one or more different domains for matches with the table headings in the proxy table ontology, the matching comprising consideration of lexical definitions of one or more terms in each CDV and a semantic taxonomic relationship defined in each CDV, as well as a context for each cell of proxy table ontology; and
aligning the first combined ontology with a CDV from the managed pool of CDVs defining (i) a domain concept schema comprising one or more domain concepts each with a plurality of lexical properties relating to one or more preferred and alternate labels for each domain concept, and (ii) a set of semantic relationships for defining one or more relationships between the one or more domain concepts by semantically matching each of the one or more row labels and one or more column labels with one or more corresponding vocabulary terms in the controlled domain vocabulary based on the set of semantic relationships;
align the second combined ontology with the domain ontology to generate a third combined ontology, wherein the aligning includes semantically mapping a domain concept defined in the controlled domain vocabulary to an ontology class defined in the domain ontology; and
populate the third combined ontology with table content from the received data table.

19. The system of claim 18, wherein the at least one server includes a knowledge repository server, wherein the client device is configured to access the ontology knowledge bases via SPARQL queries to the knowledge repository server.

20. The system of claim 19, wherein the first, second, and third combined ontologies are stored as resource description framework triple assertions in respective ontology knowledge bases in the knowledge repository server.

* * * * *